Figure 1:
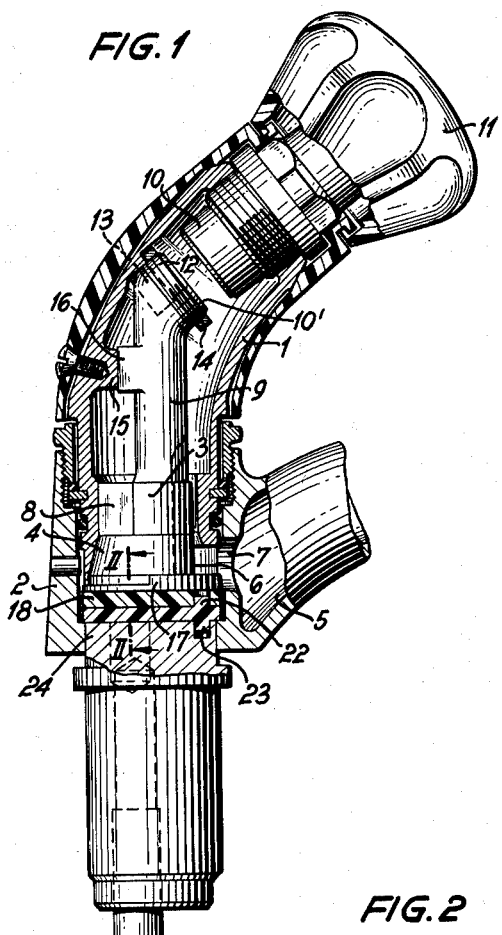

United States Patent Office 3,144,048
Patented Aug. 11, 1964

3,144,048
SINGLE HANDLE CONTROL VALVE FOR COLD AND HOT WATER OR A MIXTURE THEREOF
Josef Acker and Hans-Heinrich Classen, Lobberich, Rhineland, Germany, assignors to Rokal G.m.b.H., Lobberich, Rhineland, Germany, a firm
Filed Feb. 2, 1962, Ser. No. 170,763
Claims priority, application Germany Nov. 14, 1961
6 Claims. (Cl. 137—637.4)

The invention relates to a single handle control valve for hot and cold water or a mixture thereof, preferably for use in connection with baths, handbasins, sinks and the like, in which a hollow swivel stem serving as manipulating handle and having two ducts—one for cold and the other for hot wtaer—forms the passage for the outflowing water as well as the regulating element for the through-flow of the water. It contains also the mixing chamber for the hot and cold water, and has at its end remote from the valve housing a valve cone to be actuated through the intermediary of a knob mounted thereon for simultaneously closing and opening the flow apertures in the valve.

The object of the invention is to produce such a single handle control valve of particularly practical and simple construction.

According to the invention a plastic body inserted in the swivel stem is open at the end located in the valve housing, has two ducts, one for cold water and the other for hot water, and is designed to be carried by the stem, said body being constructed at its end remote from the interior of the stem like a plug fitted in the aperture of the stem and having a recess in its periphery for allowing the water to flow out of the stem, while extending from this plug-like portion into the hollow stem in the form of a tube and terminating in a seating surface for the valve cone. This end bears with its peripheral surface against a half collar on the inner wall of the stem and is held on the half collar by a ring nut screwed on to the end projecting out of the half collar.

Thus the single handle control valve is formed chiefly of an insert which is easy to manufacture and which can be connected to the stem without any difficulty.

The plug portion of the insert and the aperture receiving it are preferably cone-shaped so that the plug has a tight and firm seat on the end of the hollow stem.

It is likewise advisable to provide on the end of the plug located within the stem a ribbed extension on the side opposite the recess which bears against the inner wall of the hollow stem.

On the inner wall of the hollow stem a supporting surface for the plastic body projecting into the stem may be provided on the outer curvature of the stem preceding the half collar.

The end face of the plastic body located within the valve housing is, according to the invention, provided with a slide disc with apertures controlling the water admission and which bears against a fixed sealing disc in the housing with passages corresponding to the feed ducts of the valve.

At the same time an elastic sleeve is fitted at the mouths of the feed ducts and bears with its flat surface remote from the ducts against the sealing disc in the housing seat, said sleeve being provided with projecting lips extending into the cross-sectional area of the ducts and at the same time bearing against the sealing disc. These lips are pressed against the sealing disc by the water pressure so that particularly favourable sealing conditions are produced.

The sleeve has on its upper side and also on its under side a pin-like projection, one of which engages in a hole in the sealing disc while the other engages in a blind hole in the valve part provided with the feed ducts.

Figure 2:
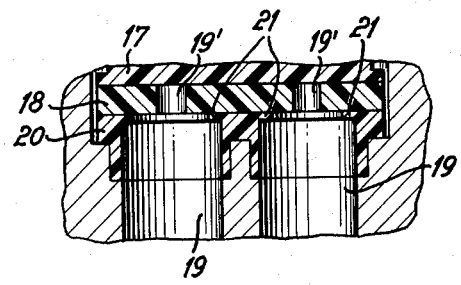

An embodiment of the invention is illustrated by way of example in the accompanying drawing, in which:

FIG. 1 is a vertical section through the control valve and
FIG. 2 is a cross-section taken on line II—II of FIG. 1.

The single handle control valve is equipped with a hollow swivel stem 1 which serves for operating the valve and is mounted in the valve housing 2 so that it can swivel at one end. The end of the swivel stem located in the valve housing is open.

An insert 3 of plastic material is introduced into the stem from this end. The end of the insert remote from the interior of the stem forms a plug 4 which is conical. The aperture accommodating the plug is correspondingly conical. In its side directed towards the valve outlet 5 the plug has a recess 6 to allow water to enter the outlet 5 through the passage 7. Extending from its conical portion the insert has on the side remote from the outlet 5 a rib 8 which bears against the inner wall of the hollow stem. The insert has a tubular extension 9. The two ducts extending in axial direction and serving one for cold and the other for hot water are not shown on the drawing. This extension 9 terminates in a seating surface 10' for the valve cone 10 which can be pressed by means of a handle knob 11 against the seating surface for closing the two ducts or lifted off the seating surface for opening the two ducts. The end 12 of the extension bears against and is gripped by the half collar 13. A ring nut 14 is screwed on to the end of the extension projecting out of the half collar. A bearing support 15 is provided on the outer curvature of the space in the stem preceding the half collar for the projecting part of the insert. The tubular extension 9 has a supporting projection 16.

The end face of the insert located within the valve body is fitted with a sliding disc 17 and is movable therewith. The two contacting surfaces are stepped. Two apertures are provided in the sliding disc corresponding to the two ducts in the insertion, which apertures are so shaped and arranged that, according to the position into which the swivel stem is turned, they allow different quantities of hot and cold water to flow through simultaneously or only cold or only hot water. The sliding disc may be made of suitable plastic material.

The sliding disc bears against a sealing disc 18 which may also be made from plastic material and is arranged in the housing seat. This sealing disc has apertures 19' which register with the feed ducts 19 in the valve.

At the mouths of the feed ducts an elastic sleeve 20 is fitted so that its flat outer surface bears against the sealing disc 18. This sleeve has edge lips 21 projecting into each of the duct cross sections. These lips also bear against the sealing disc.

Pin-like projections 22 and 23 are provided on the upper and lower sides of the sleeve and engage respectively in a hole in the sealing disc 18 and in a blind hole in the bottom 24 of the valve.

We claim:
1. A mixing valve for cold and hot water having a single valve operating handle, a valve housing forming a first valve seat at its inner end, a hollow handle shaft journalled in said valve housing and having a conical end extending into proximity of said first valve seat, inlet canals for cold and hot water in said valve housing and having outlet openings in said first valve seat, a sealing disc lodged in said first valve seat and having apertures registering with the outlet openings in said first valve seat, an insert member disposed in the inner end of said handle shaft, said insert member having a lower conical end journalled in the conical end of said handle shaft, a discharge opening in the conical end of said handle shaft, a corresponding recess in the conical end of said insert member, said hollow handle shaft constituting a mixing chamber, a passageway between the inner wall of said hollow handle shaft and said insert member to provide a passage from said mixing chamber to said discharge opening, slide means at the conical end of said insert member and having passageways for communicating with the apertures in said sealing disc, said insert member having an upper tubular extension projecting into said mixing chamber and forming a second valve seat at its upper end, said insert member having axially directed flow canals provided with inlet openings in its conical end for communication with said passageways in said slide means and with outlet openings in said second valve seat, gripping means on the inner wall of said hollow handle shaft for engaging said tubular extension and adapted to transmit the movement of said handle shaft to said insert member, and a handle knob rotatably mounted on said operating handle, said handle knob having a valve cone fixed to its inner end projecting into said mixing chamber, said valve cone being movable relative to said second valve seat upon rotation of said handle knob to control the flow of water through said discharge opening.

2. A mixing valve according to claim 1 wherein the diameter of the bores defining said inlet canals is larger adjacent the outlet openings of said first valve seat, an elastic sleeve being disposed in a groove provided around said outlet openings above said larger diameter portions, said sleeve having cylindrical extensions projecting into the larger diameter portions of said bores.

3. A mixing valve according to claim 1 wherein the end of said tubular extension has a peripheral thread, a nut ring being screwed on said thread and adapted to engage the gripping means on the inner wall of said hollow shaft.

4. A mixing valve according to claim 1 wherein said insert member consists of a synthetic material.

5. A mixing valve according to claim 1 including a rib-like projection on said insert member above its conical lower end and disposed opposite the side facing the discharge outlet, said rib-like projection engaging the opposite wall of said hollow shaft.

6. A mixing valve according to claim 1 including a bearing shoulder on the inner wall of said hollow handle shaft for engaging and supporting said tubular extension intermediate its ends.

References Cited in the file of this patent

UNITED STATES PATENTS

| | | |
|---|---|---|
| 1,299,586 | Leibing | Apr. 8, 1919 |
| 2,309,900 | Herring | Feb. 2, 1943 |
| 2,576,414 | Peterson | Nov. 27, 1951 |

FOREIGN PATENTS

| | | |
|---|---|---|
| 638,327 | Germany | Apr. 9, 1935 |
| 98,931 | Norway | Nov. 13, 1961 |